(12) United States Patent
Embler et al.

(10) Patent No.: US 9,783,324 B2
(45) Date of Patent: Oct. 10, 2017

(54) VESSEL INSULATION ASSEMBLY

(71) Applicant: The Boeing Company, Huntington Beach, CA (US)

(72) Inventors: Jonathan D. Embler, Tustin, CA (US); Timothy Leo Gaynor, III, Cypress, CA (US); Christopher S. Roper, Oak Park, CA (US); Tobias A. Schaedler, Oak Park, CA (US); Jeffrey Dale Fukushima, Coto De Caza, CA (US); Michael Leslie Hand, Huntington Beach, CA (US); Keith Y. Chong, Placentia, CA (US); Randall Colin Schubert, Santa Monica, CA (US)

(73) Assignee: THE BOEING COMPANY, Chicago, IL (US)

(*) Notice: Subject to any disclaimer, the term of this patent is extended or adjusted under 35 U.S.C. 154(b) by 6 days.

(21) Appl. No.: 14/570,370

(22) Filed: Dec. 15, 2014

(65) Prior Publication Data

US 2016/0059970 A1 Mar. 3, 2016

Related U.S. Application Data

(60) Provisional application No. 62/042,232, filed on Aug. 26, 2014.

(51) Int. Cl.
*B29C 44/18* (2006.01)
*B64G 1/40* (2006.01)
(Continued)

(52) U.S. Cl.
CPC ............ *B64G 1/402* (2013.01); *B29C 44/18* (2013.01); *B32B 3/08* (2013.01); *B32B 3/12* (2013.01);
(Continued)

(58) Field of Classification Search
CPC .. B32B 5/20; B32B 5/18; B32B 9/046; B32B 9/047; B32B 15/046
See application file for complete search history.

(56) References Cited

U.S. PATENT DOCUMENTS

| 2,710,443 A | 5/1950 | Webb | |
| 3,321,159 A * | 5/1967 | Jackson | B64D 37/06 244/135 R |

(Continued)

FOREIGN PATENT DOCUMENTS

| GB | 2048108 | 12/1980 | |
| KR | WO 2009154326 A1 * | 12/2009 | ............ B32B 3/266 |
| WO | 2011051106 A1 | 5/2011 | |

OTHER PUBLICATIONS

U.S. Appl. No. 13/618,616.
(Continued)

*Primary Examiner* — Michael Wang
(74) *Attorney, Agent, or Firm* — Armstrong Teasdale LLP

(57) ABSTRACT

A vessel includes a vessel wall and an insulation assembly coupled to the vessel wall. The insulation assembly includes a stochastic foam material and a microtruss structure encased within the foam material. The microtruss structure includes a plurality of truss members interconnected at a plurality of nodes. Each truss member is in contact with the foam material such that the microtruss structure provides a structural core for the foam material.

20 Claims, 9 Drawing Sheets

(51) Int. Cl.

| | |
|---|---|
| *B32B 5/02* | (2006.01) |
| *B32B 5/20* | (2006.01) |
| *B32B 5/22* | (2006.01) |
| *B32B 5/24* | (2006.01) |
| *B32B 5/26* | (2006.01) |
| *B32B 7/12* | (2006.01) |
| *B32B 9/00* | (2006.01) |
| *B32B 9/04* | (2006.01) |
| *B32B 15/04* | (2006.01) |
| *B32B 15/08* | (2006.01) |
| *B32B 15/14* | (2006.01) |
| *B32B 27/06* | (2006.01) |
| *B32B 27/08* | (2006.01) |
| *B32B 27/12* | (2006.01) |
| *B32B 3/08* | (2006.01) |
| *B32B 3/12* | (2006.01) |
| *B32B 3/18* | (2006.01) |
| *B32B 3/26* | (2006.01) |
| *B32B 3/28* | (2006.01) |
| B29L 31/30 | (2006.01) |
| B29K 25/00 | (2006.01) |
| B29K 27/06 | (2006.01) |
| B29K 75/00 | (2006.01) |
| B29K 79/00 | (2006.01) |
| B29K 105/04 | (2006.01) |

(52) U.S. Cl.
CPC ............... *B32B 3/18* (2013.01); *B32B 3/266* (2013.01); *B32B 3/28* (2013.01); *B32B 5/02* (2013.01); *B32B 5/028* (2013.01); *B32B 5/20* (2013.01); *B32B 5/22* (2013.01); *B32B 5/245* (2013.01); *B32B 5/26* (2013.01); *B32B 7/12* (2013.01); *B32B 9/005* (2013.01); *B32B 9/045* (2013.01); *B32B 9/046* (2013.01); *B32B 9/047* (2013.01); *B32B 15/046* (2013.01); *B32B 15/08* (2013.01); *B32B 15/14* (2013.01); *B32B 27/065* (2013.01); *B32B 27/08* (2013.01); *B32B 27/12* (2013.01); *B29K 2025/06* (2013.01); *B29K 2027/06* (2013.01); *B29K 2075/00* (2013.01); *B29K 2079/08* (2013.01); *B29K 2105/04* (2013.01); *B29L 2031/3097* (2013.01); *B32B 2255/02* (2013.01); *B32B 2255/06* (2013.01); *B32B 2255/102* (2013.01); *B32B 2255/26* (2013.01); *B32B 2260/021* (2013.01); *B32B 2260/046* (2013.01); *B32B 2262/02* (2013.01); *B32B 2262/103* (2013.01); *B32B 2262/105* (2013.01); *B32B 2262/106* (2013.01); *B32B 2266/0214* (2013.01); *B32B 2266/0228* (2013.01); *B32B 2266/0235* (2013.01); *B32B 2266/0278* (2013.01); *B32B 2266/06* (2013.01); *B32B 2266/08* (2013.01); *B32B 2305/022* (2013.01); *B32B 2307/304* (2013.01); *B32B 2307/718* (2013.01); *B32B 2307/724* (2013.01); *B32B 2307/726* (2013.01); *B32B 2439/40* (2013.01); *B32B 2605/18* (2013.01)

(56) References Cited

U.S. PATENT DOCUMENTS

| | | | | |
|---|---|---|---|---|
| 3,435,893 A | | 4/1969 | Withers | |
| 3,942,331 A | * | 3/1976 | Newman, Jr. | ............. F17C 3/02 220/560.08 |
| 3,979,005 A | * | 9/1976 | Robinson | ............... B64D 37/06 206/521 |
| 4,125,152 A | | 11/1978 | Kestner et al. | |
| 4,683,121 A | | 7/1987 | Gourdiaan et al. | |
| 4,774,118 A | * | 9/1988 | Davis | ........................ B32B 5/24 156/297 |
| 5,741,574 A | * | 4/1998 | Boyce | ................... B29C 44/569 428/112 |
| 6,941,888 B2 | * | 9/2005 | Barsoum | .................... B63B 3/09 114/356 |
| 7,190,580 B2 | | 3/2007 | Bezama et al. | |
| 7,401,643 B2 | * | 7/2008 | Queheillalt | ............ C23C 14/046 165/104.21 |
| 7,424,967 B2 | * | 9/2008 | Ervin | ....................... A47J 36/02 228/181 |
| 7,879,276 B2 | * | 2/2011 | Guzman | ............... B29C 44/583 156/182 |
| 7,913,611 B2 | * | 3/2011 | Terry | .................... F41H 5/0414 89/36.02 |
| 7,963,085 B2 | * | 6/2011 | Sypeck | ................... B29D 24/00 52/652.1 |
| 8,320,727 B1 | * | 11/2012 | Jacobsen | .......... B29D 11/00663 264/1.24 |
| 8,413,762 B1 | * | 4/2013 | Wang | ........................ B64C 1/40 181/290 |
| 8,419,883 B2 | * | 4/2013 | Day | .................... B29C 44/1285 156/169 |
| 8,431,214 B2 | * | 4/2013 | Chakrabarti | ............. E04C 2/296 428/223 |
| 8,573,289 B1 | | 11/2013 | Roper et al. | |
| 8,586,179 B1 | * | 11/2013 | Jacobsen | .................... B32B 7/08 428/315.5 |
| 8,663,539 B1 | * | 3/2014 | Kolodziejska | ........ B29C 67/007 264/401 |
| 8,800,641 B2 | * | 8/2014 | Jacobsen | ................ F28F 13/003 165/136 |
| 9,194,125 B1 | * | 11/2015 | Romanenko | ............... E04C 1/40 |
| 2003/0010483 A1 | | 1/2003 | Ikezaki et al. | |
| 2004/0256395 A1 | | 12/2004 | Lak et al. | |
| 2006/0101849 A1 | | 5/2006 | Taras et al. | |
| 2007/0292654 A1 | * | 12/2007 | Bohner | ..................... B64G 1/14 428/76 |
| 2009/0155502 A1 | * | 6/2009 | Cournoyer | ................ B32B 1/08 428/34.1 |
| 2010/0080942 A1 | * | 4/2010 | McCarville | ........... B29C 70/086 428/34.1 |
| 2010/0101978 A1 | | 4/2010 | Gordon et al. | |
| 2010/0151189 A1 | | 6/2010 | Chakrabarti | |
| 2010/0300669 A1 | | 12/2010 | Jacobsen et al. | |
| 2010/0323181 A1 | * | 12/2010 | Nutt | ...................... B29C 70/205 428/221 |
| 2012/0090265 A1 | * | 4/2012 | McCarville | ........... B29C 65/505 52/783.1 |
| 2013/0055881 A1 | * | 3/2013 | Bird | .......................... B32B 5/26 89/36.02 |
| 2013/0143060 A1 | * | 6/2013 | Jacobsen | ................ B29C 71/02 428/594 |
| 2013/0303067 A1 | * | 11/2013 | Doty | ........................ B32B 3/12 454/76 |
| 2014/0272277 A1 | * | 9/2014 | Schaedler | ................ C09D 1/00 428/116 |
| 2016/0046098 A1 | * | 2/2016 | Pinney | ...................... B32B 7/08 428/116 |

OTHER PUBLICATIONS

U.S. Appl. No. 13/786,367, filed Mar. 5, 2013.
U.S. Appl. No. 14/185,665.
Canadian Office Action, Application Number, 2,836,709, dated Feb. 10, 2015, pp. 3.
Canadian Office Action, Application Number, 2,836,709, dated Dec. 21, 2015, pp. 3.
European Search Report, Application No. 14157663.7, dated May 20, 2014, pp. 5.
European Search Report, Application No. 14157663.7, dated Oct. 9, 2015, pp. 4.

(56) References Cited

OTHER PUBLICATIONS

Extended European Search Report, Application No. 15199572.7, dated May 12, 2016, pp. 7.

* cited by examiner

VESSEL INSULATION ASSEMBLY

CROSS REFERENCE TO RELATED APPLICATIONS

This application claims priority to U.S. Provisional Application No. 62/042,232 filed on Aug. 26, 2014, which is hereby incorporated by reference in its entirety.

BACKGROUND

The present disclosure relates generally to an insulation assembly for use with cryogenic propellant vessels, and, more specifically, to an insulation assembly that includes a micro-truss reinforced cryofoam.

Aerospace vehicle designs commonly utilize a variety of propellants to supply both launch/takeoff and maneuvering power requirements. The quantity of propellant required for most missions, especially for launch/takeoff requirements, often generates severe design constraints and can require considerable portions of vehicle size to be dedicated towards the carrying of propellant. The use of cryogenic propellants allows the propellants to be maintained in a liquid state rather than in their room temperature gaseous form. This allows a greater quantity of propellant to be stored in a smaller container. This, in turn, improves the design capabilities of aerospace vehicles.

Current cryogenic propellant vessel technology for expendable launch systems such as the external vessel of the space shuttle use spray-on foam insulation. This technology, however, does not commonly satisfy the strength and reusability requirements associated with multi-mission flight environments. Expendable launch systems are often not considered appropriate for integration into reusable vehicle designs, such as commercial aircraft and reusable space vehicles. For example, reusable space vehicle designs often require such vehicles to carry the cryogenic propellant vessels through launch, on-orbit, and reentry. The cryogenic insulation ("cryoinsulation") is required to reduce launch pad cryogen boil-off and thermally protect propellant vessels during ground servicing, launch, on-orbit, and reentry. In addition, the cryoinsulation must be robust enough to withstand repeated thermal cycling.

At least some known cryoinsulation is applied to the exterior of the propellant vessels and can consist of a foam insulation layer. However, such foams are generally not suitable as cryoinsulation by themselves owing to their tendency to crack, delaminate from the propellant vessel walls, and/or fragment (a condition often referred to as spalling where flakes of a material detach from a larger solid body) when subjected to a combination of cryogenic temperatures and mechanical loads. Therefore, at least some known cryoinsulation includes and a honeycomb core that provides mechanical reinforcement to the foam layer to reduce cracking, delamination, and spalling. However, such honeycomb material substantially increases the weight of the reusable aerospace vehicle, which leads to additional propellant consumption and higher costs.

Accordingly, the present disclosure provides for a cryofoam insulation that satisfies the strength and reusability requirements associated with multi-mission flight environments. Furthermore, the present disclosure provides for a cryofoam insulation that is lightweight, and thus reduces the operating costs of the vehicle.

BRIEF DESCRIPTION

In one aspect, a vessel is provided. The vessel includes a vessel wall and an insulation assembly coupled to the vessel wall. The insulation assembly includes a stochastic foam material and a microtruss structure encased within the foam material. The microtruss structure includes a plurality of truss members interconnected at a plurality of nodes. Each truss member is in contact with the foam material such that the microtruss structure provides a structural core for the foam material.

In another aspect, an aerospace vehicle is provided. The aerospace vehicle includes a vessel that includes a vessel wall defining an inner volume configured to hold a propellant supply. The aerospace vehicle also includes a reinforced insulation assembly coupled to the vessel wall. The insulation assembly includes a stochastic foam material and a microtruss structure encased within the foam material such that the microtruss structure provides a structural core for the foam material.

In yet another aspect, a method of manufacturing an insulation assembly is provided. The method includes fabricating a microtruss structure having a plurality of truss members interconnected at a plurality of nodes and coupling the microtruss structure to a wall of a vessel. The method also includes applying a foam material to the microtruss structure and the vessel wall such that the microtruss structure is encased within the foam material to provide a structural core for the foam material.

The features, functions, and advantages that have been discussed can be achieved independently in various embodiments of the present disclosure or may be combined in yet other embodiments further details of which can be seen with reference to the following description and drawings.

DETAILED DESCRIPTION

The described embodiments relate to a cryofoam insulation assembly having a microtruss structure encased therein. In various embodiments, the truss structure includes a plurality of members extending from a node and attached to a support structure. In certain embodiments, the truss members are hollow. With regard to both hollow and non-hollow truss embodiments, a foam material is applied about the microtruss such that the microtruss provides a structural core of the cryofoam insulation.

Figure 1:
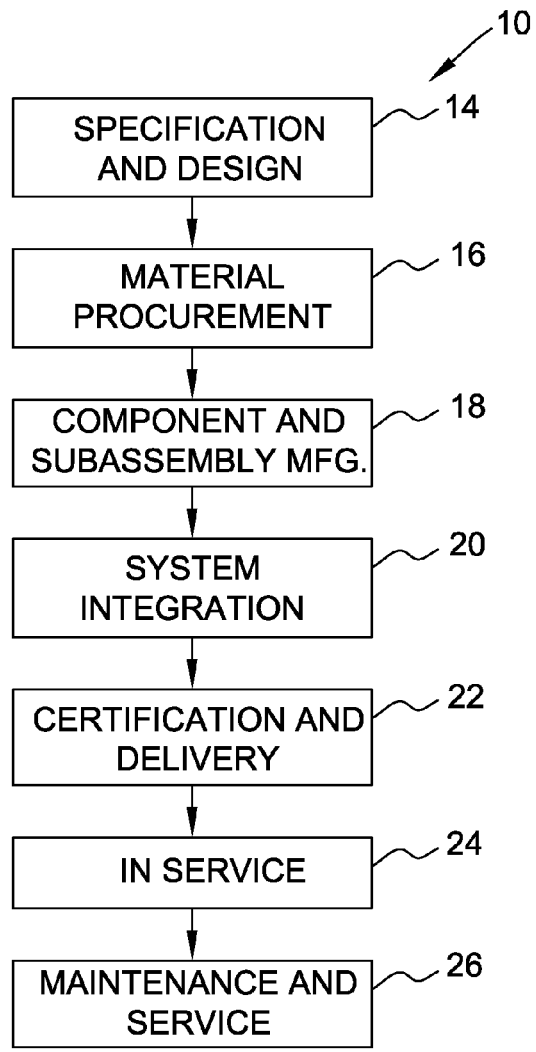
FIG. 1 is a flow diagram of an exemplary aircraft production and service methodology.
Figure 2:
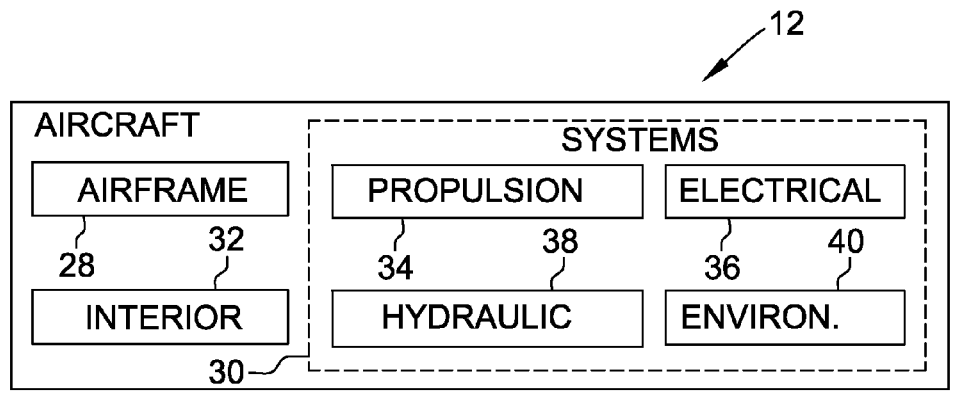
FIG. 2 is a block diagram of an exemplary aircraft.

Referring FIG. 1, implementations of the disclosure may be described in the context of an aircraft manufacturing and service method 10 and via an aircraft 12 (shown in FIG. 2). During pre-production, including specification and design 14 data of aircraft 12 may be used during the manufacturing process and other materials associated with the airframe may be procured 16. During production, component and subassembly manufacturing 18 and system integration 20 of aircraft 12 occurs, prior to aircraft 12 entering its certification and delivery process 22. Upon successful satisfaction and completion of airframe certification, aircraft 12 may be placed in service 24. While in service by a customer, aircraft 12 is scheduled for periodic, routine, and scheduled maintenance and service 26, including any modification, reconfiguration, and/or refurbishment, for example. In alternative implementations, manufacturing and service method 10 may be implemented via vehicles other than an aircraft.

Each portion and process associated with aircraft manufacturing and/or service 10 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 12 produced via method 10 may include an airframe 28 having a plurality of systems 30 and an interior 32. Examples of high-level systems 30 include one or more of a propulsion system 34, an electrical system 36, a hydraulic system 38, and/or an environmental system 40. Any number of other systems may be included.

Apparatus and methods embodied herein may be employed during any one or more of the stages of method 10. For example, components or subassemblies corresponding to production process 18 may be fabricated or manufactured in a manner similar to components or subassemblies produced while aircraft 12 is in service. Also, one or more apparatus implementations, method implementations, or a combination thereof may be utilized during the production stages 18 and 20, for example, by substantially expediting assembly of, and/or reducing the cost of assembly of aircraft 12. Similarly, one or more of apparatus implementations, method implementations, or a combination thereof may be utilized while aircraft 12 is being serviced or maintained, for example, during scheduled maintenance and service 26.

As used herein, the term "aircraft" may include, but is not limited to, airplanes, unmanned aerial vehicles (UAVs), gliders, helicopters, spacecraft, reusable launch vehicles, and/or any other object that travels through airspace. Further, in an alternative implementation, the aircraft manufacturing and service method described herein may be used in any manufacturing and/or service operation.

Figure 3:
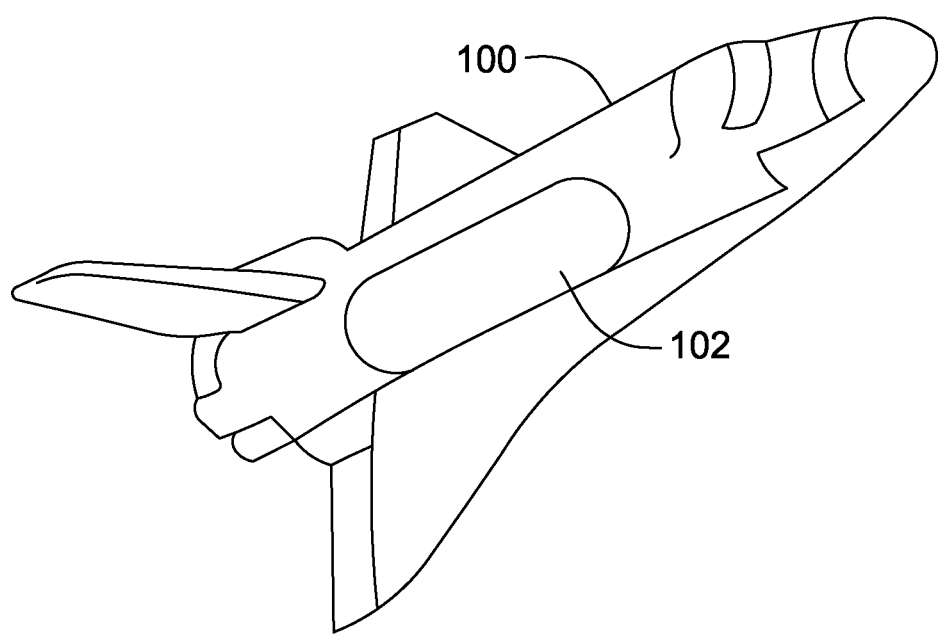
FIG. 3 is an illustration of an exemplary aerospace vehicle including an exemplary cryogenic propellant vessel assembly.

FIG. 3 illustrates an exemplary aerospace vehicle 100. such as an aircraft 12 in method 10 (shown in FIGS. 1 and 2) having at least one cryogenic propellant tank or vessel 102 in accordance with the present disclosure. In one implementation vehicle 100 is a reusable launch vehicle for use in space oriented missions. In another suitable implementation, vehicle 100 is a vehicle used in intra-atmosphere flights, such as a hydrogen powered passenger aircraft. Generally, it should be understood that propellant vessel 102 can be utilized in a wide variety of aerospace vehicles 100 and the vehicle shown is for illustrative purposes only. Furthermore, vehicle 100 may include more than the single propellant vessel 102 shown in FIG. 3. It should be understood, however that the number and orientation of propellant vessel 102 within vehicle 100 are contemplated to be application specific.

Figure 4:
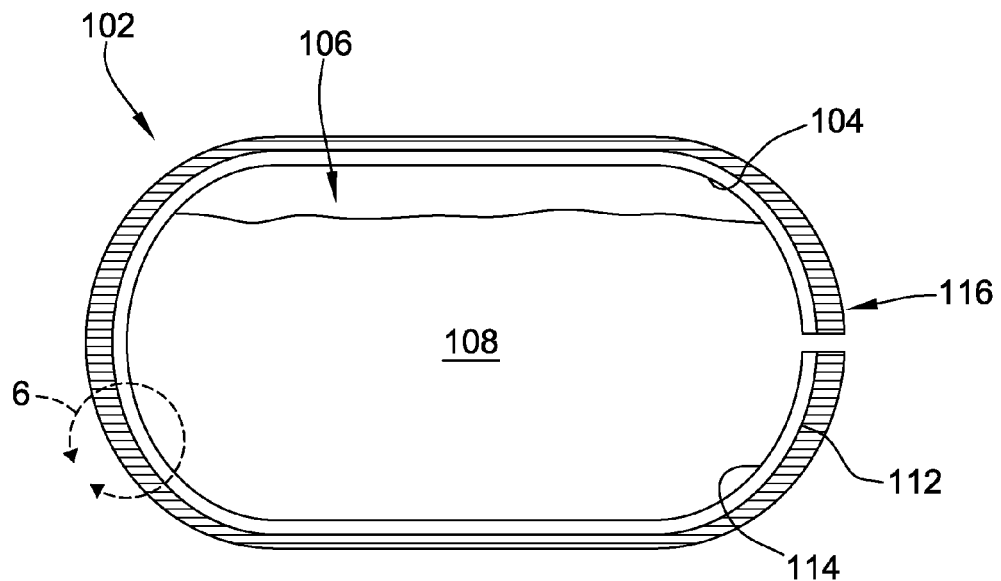
FIG. 4 is a cross-sectional illustration of the cryogenic propellant vessel illustrated in FIG. 3, illustrating an exemplary insulation assembly coupled to an exterior surface of a propellant vessel.
Figure 5:
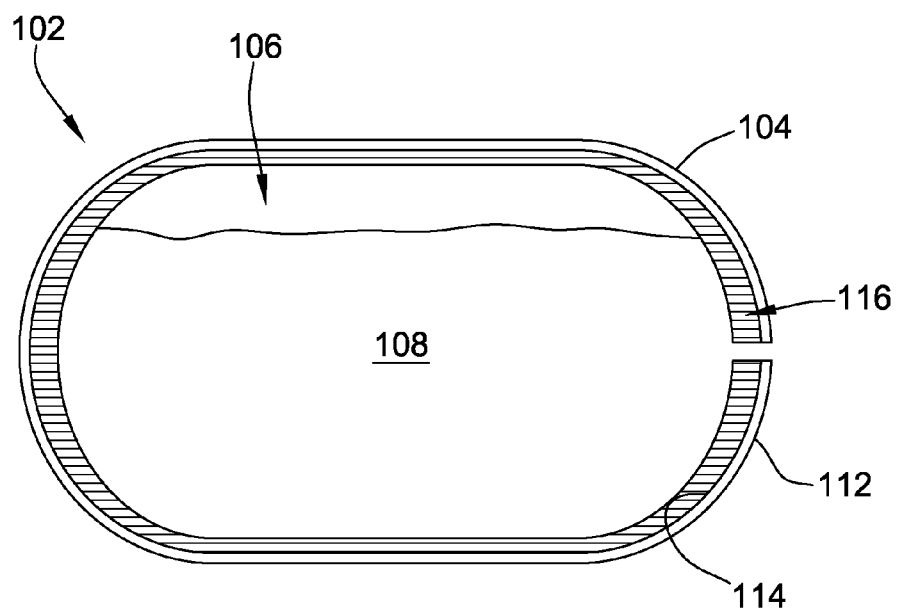
FIG. 5 is a cross-sectional illustration of an alternative cryogenic propellant vessel assembly illustrating the insulation assembly shown in FIG. 4 coupled to an interior surface of a propellant vessel.

FIG. 4 is a cross-sectional illustration of cryogenic propellant vessel 102. In the exemplary implementation, vessel 102 includes a vessel wall 104 that defines an inner volume 106 configured to house a supply of cryogenic propellant 108. The supply of cryogenic propellant 108 should be thermally protected such that propellant 108 is kept within a temperature range suitable to prevent boil-off or phase change. As used herein, the term "cryogenic" or "cryo-" is used to refer to any substance in liquid phase that boils at or below about −160° C. (−256° F.) when under standard atmospheric pressure. Non-limiting examples of cryogenic propellants that maybe be contained within vessel 102 include oxygen, nitrogen, and hydrogen. Vessel 102 may also contain helium. Disclosed herein is a unique approach to maintaining propellant 108 at such a temperature range through the use of a reinforced insulation assembly or reinforced cryofoam 116 coupled to wall 104 of propellant vessel 102. In one implementation, as shown in FIG. 4, reinforced cryofoam 116 is coupled to an exterior surface 112 of wall 104. Alternatively, as shown in FIG. 5, reinforced cryofoam 116 is coupled to an interior surface 114 of wall 104. Additionally, reinforced cryofoam 116 may be coupled to both surfaces 112 and 114 of propellant vessel wall 104. Furthermore, reinforced cryofoam 116 may be coupled to surface 112 in some regions of vessel wall 104 and to surface 114 in other regions of vessel wall 104.

Figure 6:
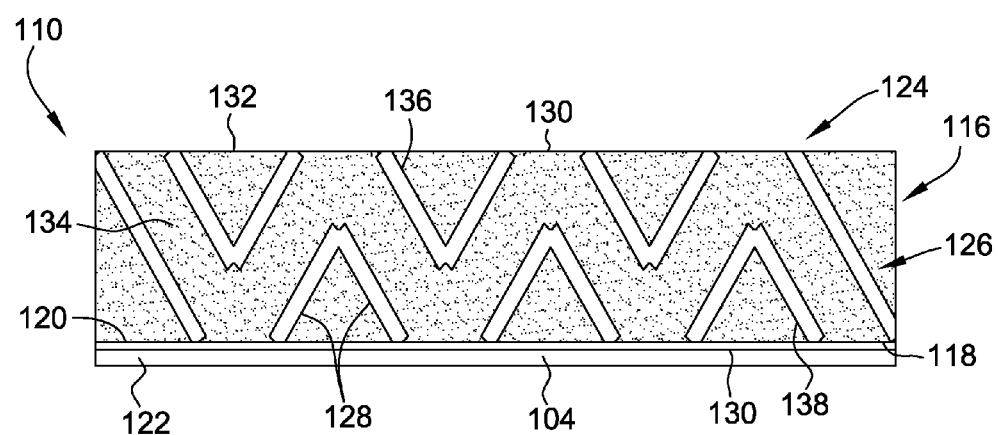
FIG. 6 is a cross-sectional illustration of the exemplary insulation assembly shown in FIGS. 4 and 5.

FIG. 6 is a cross-sectional illustration of insulation assembly 110. In the exemplary implementation, insulation assembly 110 includes reinforced cryofoam layer 116 and a support structure 122. Cryofoam layer 116 includes a bottom surface 118 that is coupled to a top surface 120 of support structure 122. More specifically, top surface 120 of support structure 122 is one of exterior surface 112 or interior surface 114 of wall 104 of propellant vessel 102 (shown in FIGS. 4 and 5). As shown in FIG. 6, support structure 122 is made from a solid sheet of material, such as a carbon composite reinforced polymer material. Alternatively, support structure 122 is made from any material, such as, but not limited to, polymer, ceramic, metal, or any combination thereof. Furthermore, although support structure 122 is shown in FIG. 6 as a substantially flat member, support structure 122 may be curved such that support structure defines at least one radius of curvature.

In the exemplary implementation, reinforced cryofoam 116 includes a microtruss structure 124 encased by a stochastic foam material 126. Foam material 126 may be either open cell or closed cell and is made from a material such as, but not limited to, polyurethane, polystyrene, polyimide, polyvinyl chloride, silicone, or any combination thereof.

Microtruss structure 124 provides a structural core for foam material 126 and may be utilized to broaden the range of foam materials that can be utilized by insulation assembly 110 by removing or reducing strength requirements from foam material 126. As described in further detail below, foam material 126 is one of poured or sprayed about each truss member 128 of microtruss structure 124. Alternatively, foam material 126 is applied to truss members 128 of microtruss structure 124 in any manner that facilitates operation of cryofoam layer 116 as described herein.

Figure 7:
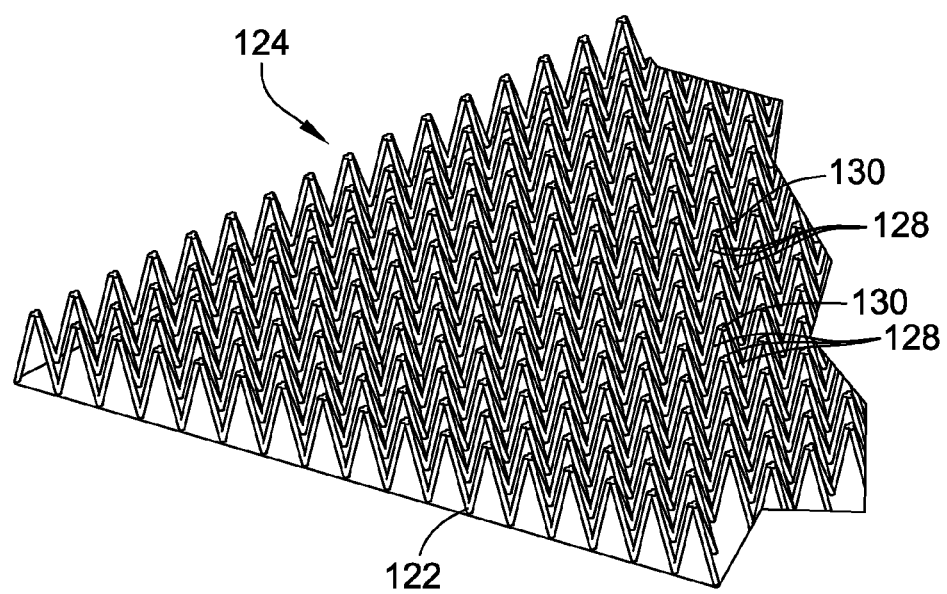
FIG. 7 is a perspective view of an exemplary microtruss structure that may be used with the insulation assembly shown in FIG. 6

As shown in FIG. 6, and in FIG. 7 illustrating insulation assembly 110 without foam material 126, microtruss structure 124 includes a plurality of truss members 128 that intersect each other at corresponding ends to define a node 130. In the exemplary implementation, nodes 130 are positioned only at bottom surface 118 and a top surface 132 of cryofoam layer 116 such that microtruss 124 is comprised of repetitions of half a unit cell. As used herein, the term "unit cell" is meant to describe the smallest group truss members 128 and nodes 130 from which the entire microtruss structure 124 can be built up by repetition in three dimensions. Alternatively, microtruss structure 124 may include a plurality of nodes 130 between surfaces 118 and 132 such that microtruss 124 defines as many unit cells as necessary to facilitate operation of insulation assembly 110 as described herein.

Figure 8:
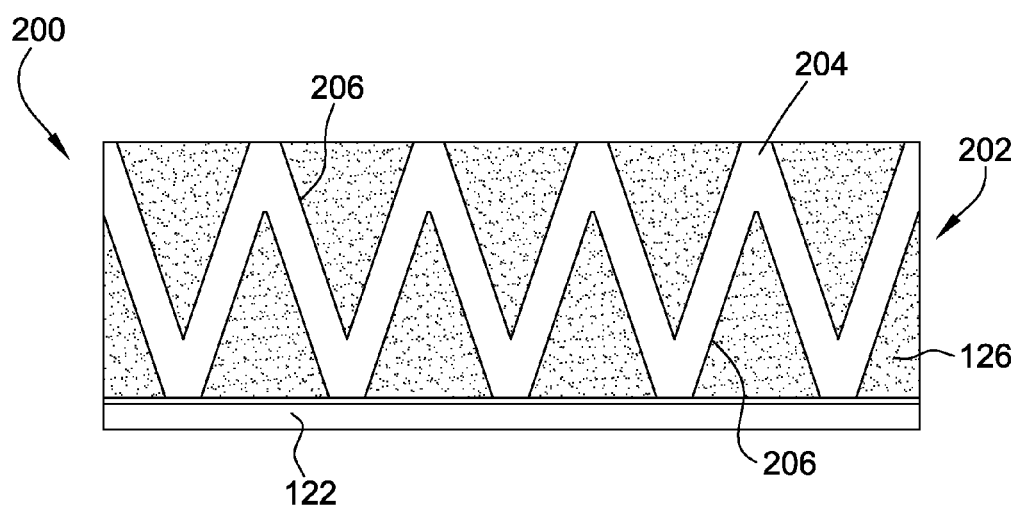
FIG. 8 is a cross-sectional illustration of an alternative insulation assembly that may be used with the cryogenic propellant vessel assembly shown in FIGS. 4 and 5.

As shown in FIGS. 6 and 7, in the exemplary implementation, truss members 128 are thin-walled hollow structures such that foam material 126 not only extends between individual truss members 128, but also is channeled within an interior 134 of each truss member 128. In one implementation foam material 126 between truss members 128 and within hollow members 128 is the same material. In another implementation, micro-truss reinforced cryofoam 116 could achieve a higher strength per weight when a denser, stronger foam material is filled inside hollow truss members 128 and a less dense foam material is filled around and between truss members 128. Alternatively, as shown in FIG. 8, an alternative insulation assembly 200 includes a cryofoam layer 202 having foam material 126 and a microtruss structure 204 that includes substantially solid truss members 206. In another alternative implementation, foam material 126 is applied to only the outsides of hollow truss members 128 and not within hollow members 128 or only within hollow members 128 and not to the outsides of members 128.

Hollow truss members 128 are generally preferred over solid truss members 206 because microtruss 124 having hollow truss members 128 is generally a lighter weight than microtruss 204 having solid truss members 206. Furthermore, for microtruss structures of equivalent mass and unit cell dimensions, hollow microtruss 124 will have shorter maximum distances from truss members 128 to any point in stochastic foam 126 than microtruss 204 having solid truss members 206. Hollow truss members 128, having less mass, also decrease the thermal conductance of microtruss structure 124. However, in implementations where mechanical loads are of greater concern than overall weight of the insulation assembly, then microtruss structure 204 having solid truss members 206 may be preferred.

In one embodiment, hollow truss members 128 have a diameter that is within a range of between approximately 1.0 millimeter (mm) (0.039 inches (in.)) and approximately 12.0 mm (0.472 in.). Alternatively, truss members 128 may have any diameter that facilitates operation of insulation assembly 110 as described herein. Furthermore, the density of truss members 128 in microtruss structure 124 is within a range of between approximately 0.10 pound per cubic foot (lb./ft.$^3$) (1.60 kilograms per cubic meter (kg/m$^3$)) and approximately 1.0 lb./ft.$^3$ (16.01 kg/m3). Alternatively, microtruss structure 124 may have any density that facilitates operation of insulation assembly 110 as described herein. Additionally, reinforced cryofoam layer 116 includes a thickness within a range of between approximately 12.7 mm (0.5 in.) and approximately 50.8 mm (2.0 in.). Alternatively, cryofoam layer 116 may have any thickness that facilitates operation of insulation assembly 110 as described herein.

As shown in FIG. 7, each truss member 128 includes a substantially circular cross-sectional profile. Alternatively, the cross-sectional profile of each truss member 128 is shaped as one of a teardrop, circle, or airfoil. Moreover, each truss member 128 includes a first end 136 proximate top surface 132 and a second end 138 proximate bottom surface 118. In one implementation, end 136 may have a different cross-sectional shape and/or cross-sectional area than second end 138 such that the cross-sectional shape and/or cross-sectional area of each truss member 128 changes between surfaces 132 and 118. Furthermore, different cross-sectional profiles and diameters can be used in different regions of microtruss structure 124.

In the exemplary implementation, microtruss structure 124 is fabricated from at least one of a ceramic material, a metal, a metal alloy, a polymer material, or any combination thereof. Alternatively, microtruss 124 may be fabricated from any material that facilitates operation of insulation assembly 110 as described herein. One implementation of insulation assembly 110 utilizes a polymer material, and more specifically, a parylene polymer material to fabricate microtruss 124. Polymer is a preferred material because of its relatively low thermal conductivity rate compared to ceramics and metals.

Furthermore, microtruss 124 may be fabricated using any number of methods. In one method, a substantially solid polymer scaffold is formed using a manufacturing process such as, but not limited to, self-propagating photopolymer waveguides, stereo lithography, and injection molding. The scaffold is then coated with a plating material to form truss members 1248. In one embodiment, the plating material is a polymer, but may be any material that facilitates operation of insulation assembly 110, as described above. Once coated, the scaffold is treated using a chemical or heat treatment to dissolve the scaffold, leaving hollow truss members 128 comprised of the polymer coating material.

In another implementation, hollow microtruss 124 is fabricated directly using an additive manufacturing process without requiring fabrication of a scaffold for plating. Direct additive manufacturing eliminates the plating process and enables additional surface features, such as, but not limited to projections, to be formed on truss members 128 for enhanced foam adhesion.

Figure 9:
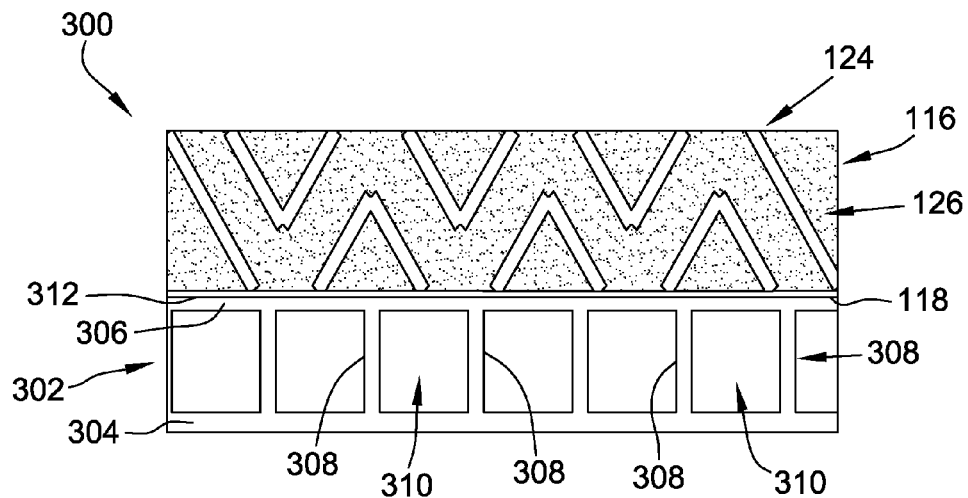
FIG. 9 is a cross-sectional illustration of another alternative insulation assembly that may be used with the cryogenic propellant vessel assembly shown in FIGS. 4 and 5.

FIG. 9 is a cross-sectional illustration of an alternative insulation assembly 300 that may be used with aerospace vehicle 100 (shown in FIG. 3). Insulation assembly 300 is substantially similar to insulation assembly 110 (shown in FIG. 6) with the exception that insulation assembly 110 includes reinforced cryofoam layer 116 coupled to a substantially solid support structure and insulation assembly 300 includes a substantially similar cryofoam layer 116 coupled to a sandwich support structure 302. As such, elements common to both insulation assemblies 110 and 300 are labeled with reference numerals as used in FIG. 6.

Support structure 302 includes a bottom wall 304 and a top wall 306 that are separated by a plurality of supports 308 such that a plurality of cavities 310 are defined therebetween. More specifically, each cavity 310 is defined by bottom wall 304, top wall 306, and a pair of adjacent supports 308. Top wall 306 includes a top surface 312 that is coupled to bottom surface 118 of cryofoam layer 116. In one embodiment, cavities 310 are filled with air or another insulator to provide an additional layer of insulation between cryogenic propellant supply 108 (shown in FIG. 2) and an outside environment.

Figure 10:
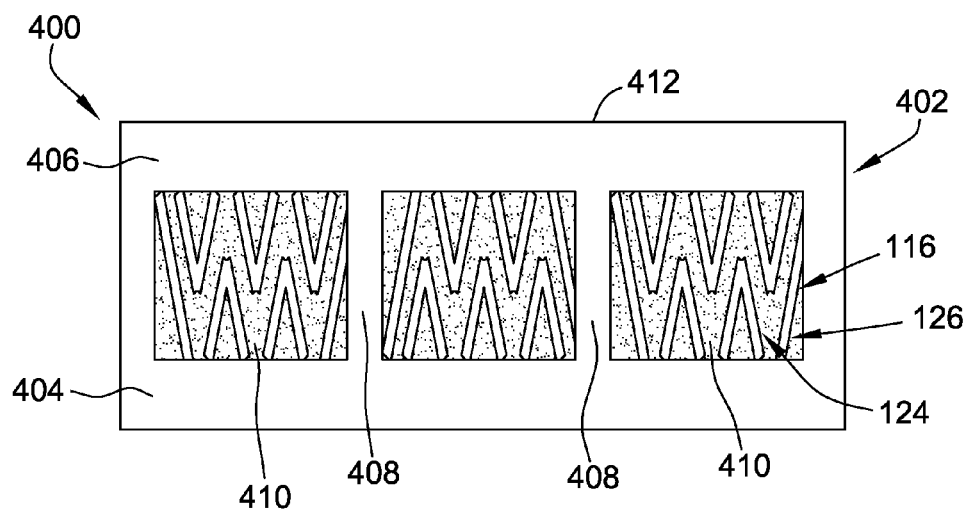
FIG. 10 is a cross-sectional illustration of yet another alternative insulation assembly that may be used with the cryogenic propellant vessel assembly shown in FIGS. 4 and 5.

FIG. 10 is a cross-sectional illustration of yet another insulation assembly 400 that may be used with aerospace vehicle 100 (shown in FIG. 3). Insulation assembly 400 is substantially similar to insulation assembly 110 (shown in FIG. 6) with the exception that reinforced cryofoam layer 116 of insulation assembly 110 is coupled to top surface 120 of substantially solid support structure 122 and insulation assembly 400 includes reinforced cryofoam layer 116 coupled within a sandwich support structure 402. As such, elements common to both insulation assemblies 110 and 400 are labeled with reference numerals as used in FIG. 6.

Support structure 402 includes an inner wall 404 and an outer wall 406 that are separated by a plurality of supports 408 such that a plurality of cavities 410 are defined therebetween. More specifically, each cavity 410 is defined by inner wall 404, outer wall 406, and a pair of adjacent supports 408. Cryofoam layer 116 is coupled within cavities 410 between walls 404 and 406. More specifically, strips of cryofoam 116 are coupled within each cavity 410 defined between adjacent supports 408. Insulation assembly 400 may also include an additional layer of cryofoam 116 coupled to a top surface 412 of outer wall 406 to provide further insulation between cryogenic propellant supply 108 (shown in FIG. 4) and an outside environment.

Figure 11:
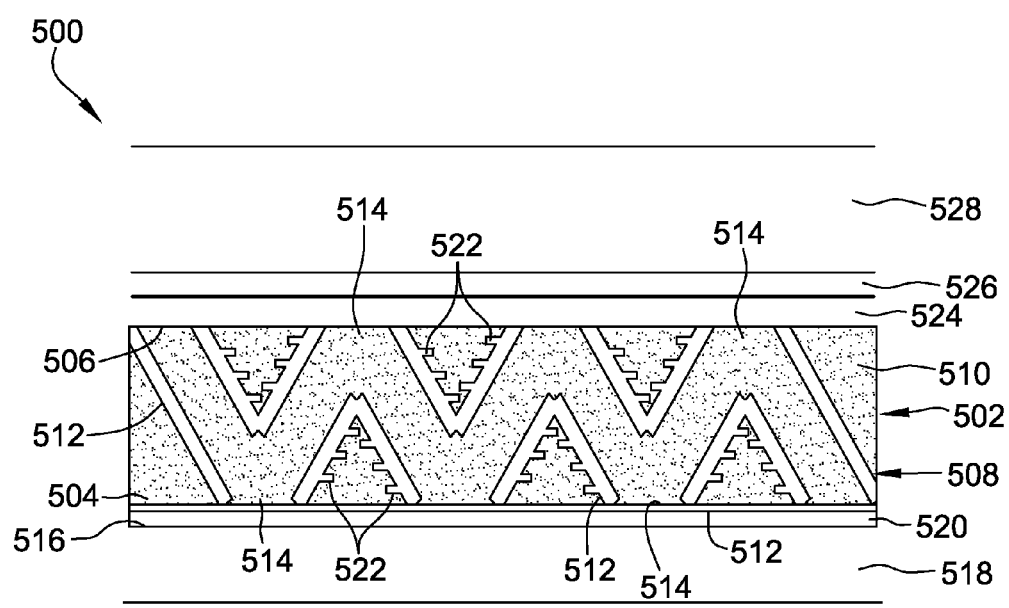
FIG. 11 is a cross-sectional illustration of yet another alternative insulation assembly that may be used with the cryogenic propellant vessel assembly shown in FIGS. 4 and 5.

FIG. 11 is a cross-sectional illustration of another alternative insulation assembly 500 that may be used with aerospace vehicle 100 (shown in FIG. 3). In the exemplary implementation, insulation assembly 500 includes a reinforced cryofoam layer 502 that includes a bottom surface 504 and a top surface 506. Cryofoam layer 502 is substantially similar to cryofoam layer 116 (shown in FIG. 6) in that cryofoam layer 502 includes a hollow microtruss structure 508, which is substantially similar to microtruss structure 124 (shown in FIG. 6), positioned within a stochastic foam material 510, which is substantially similar to foam material 126 (shown in FIG. 6). Similar to microtruss 124, microtruss 508 includes a plurality of truss members 512 that intersect each other at corresponding ends to define a node 514 such that nodes 514 are positioned only at bottom surface 504 and top surface 506 of cryofoam layer 502.

In the exemplary implementation, bottom surface 504 of cryofoam layer 502 is mechanically coupled to a top surface 516 of a support structure 518, which is substantially similar to support structure 122 (shown in FIG. 6) using an adhesive 520. In one implementation, adhesive 520 is a paste adhesive selectively applied to nodes 514 such that adhesive 520 is only applied at around the points of mechanical contact between microtruss 508 and support structure 518. Alternatively, adhesive 520 may be a film adhesive, a reinforced film adhesive, or a spray adhesive. Furthermore, in one implementation, adhesive 520 is an epoxy or polyurethane adhesive. Alternatively, adhesive 520 is an adhesive material such as, but not limited to, maleimide, bismaleimide, benzoxazine, cyanate ester, phenolic, polyimide, or any combination thereof As shown in FIG. 11, reinforced cryofoam layer 502 includes a plurality of adhesion features 522 that provide additional area for adhesion between microtruss 508 and stochastic polymer foam 510. In one implementation, adhesion features 522 are fibers or projections on microtruss members 512 that are not aligned with microtruss 508 such that foam 510 is reinforced in multiple directions. Alternatively, adhesion features 522 are filler materials, such as, but not limited to, glass fibers or carbon fibers, that are dispersed at least one of inside hollow truss members 512 and between truss members 512 to mechanically reinforce foam 510.

Insulation assembly 500 also includes a sealant 524 coupled to top surface 506 of reinforced cryofoam layer 502. In one implementation, sealant 524 is a polyurethane-based polymer that may include an adhesive and is applied to cryofoam layer 502 using a brush or sprayed onto surface 506. Alternatively, sealant 524 may be made from any material and applied to cryofoam layer 502 in any manner. In implementations where cryofoam 502 is coupled to interior surface 114 of propellant vessel wall 104 (shown in FIG. 5) sealant 524 serves as a containment membrane to isolate propellant supply 108 (shown in FIG. 5) from cryofoam 502. In implementations where cryofoam 502 is coupled to exterior surface 112 (shown in FIG. 4), sealant 524 provides increased protection of the cryogenic propellant supply 108 from particle impact experienced in flight. In such implementations, sealant 524 may also create a uniform outer surface that allows for improved bonding with any subsequent layers of material.

In one implementation, insulation assembly 500 also includes a permeable membrane 526 coupled to sealant layer 524. Alternatively, insulation assembly 500 may not include sealant 524 and membrane 526 may be coupled to top surface 506 of reinforced cryofoam layer 502. Membrane 526 is a selectively permeable membrane that allows a flow of fluids (gases and liquids) therethrough, but prevents the passages of solid particulates. The use of membrane 526 provides additional protection by generating an additional barrier that prevents outside particles from impinging on cryofoam 502 and prevents broken particles of cryofoam 502 from escaping. In one implementation, membrane 526 is formed from a similar material as support structure 518, that is, a loose weave fabric of carbon fiber or graphite fiber, but having a plurality of minute holes (not shown).

In implementations where cryofoam layer 502 is coupled to exterior surface 112 of propellant vessel wall 104, insulation assembly 500 may also include a thermal protection layer 528 coupled to membrane 526. Alternatively, insulation assembly 500 may not include membrane 526 and thermal protection layer 528 may be coupled to sealant 524, or directly to top surface 506 of reinforced cryofoam layer 502 in implementations where insulation assembly 500 includes neither sealant 524 nor membrane 526. Thermal protection layer 528 provides thermal protection to underlying layers, such as any of layers 502, 524, and 526, during re-entry of a reusable space vehicle. Thermal protection layer 528 generally includes a plurality of ceramic tiles. Alternatively, thermal protection layer 528 may include any material that provides thermal protection to at least cryofoam layer 502. As described above insulation assembly 500 includes at least support structure 518 and reinforced cryofoam layer 502, but may also include any combination of adhesive 520, sealant 524, membrane 526, and thermal protection layer 528.

Figure 12:
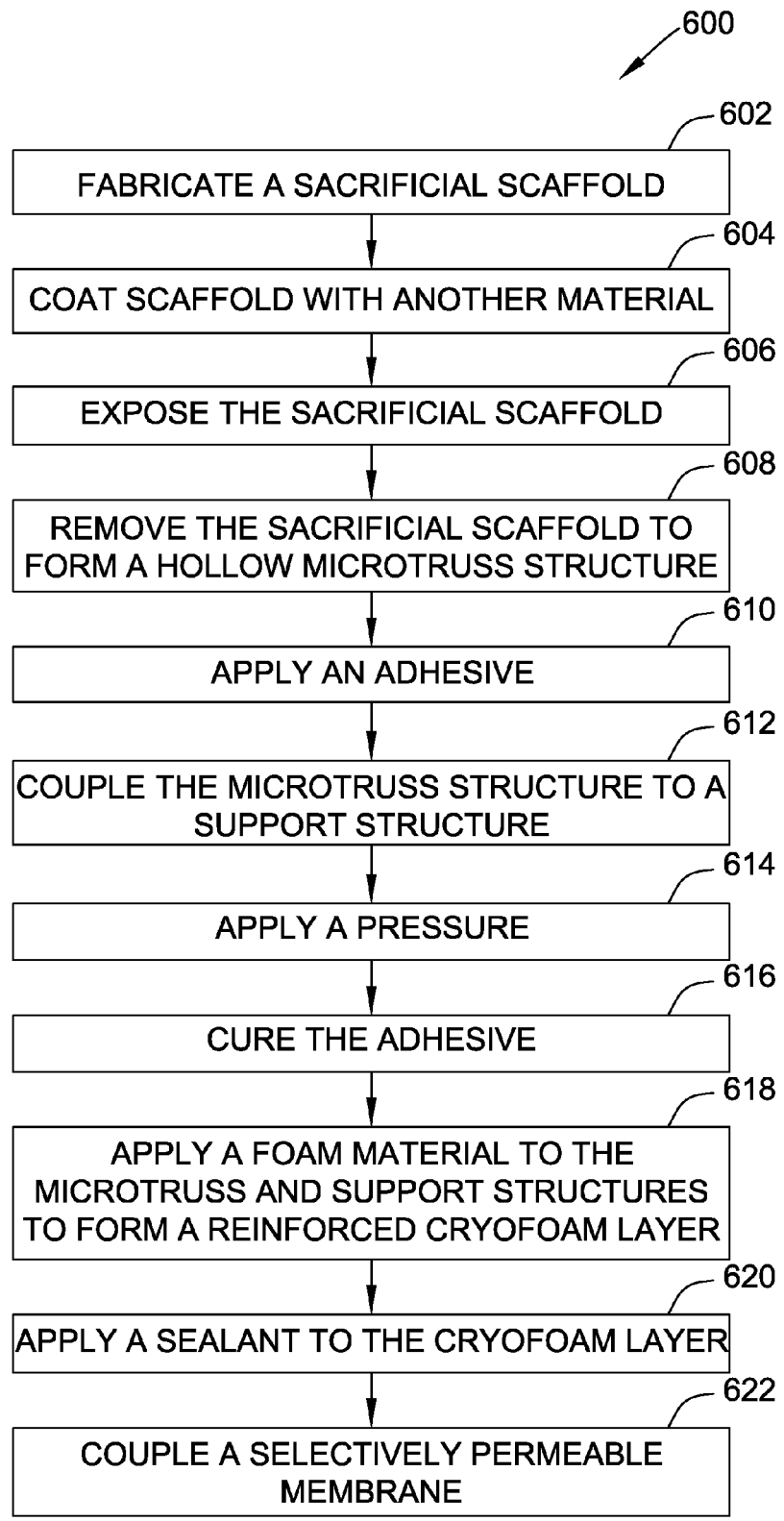
FIG. 12 is a flow diagram of an exemplary method of manufacturing the insulation assembly shown in FIG. 11.

FIG. 12 is a flow diagram of an exemplary method 600 of manufacturing insulation assembly 500 (shown in FIG. 11). Method 600 includes fabricating 602 a sacrificial microtruss scaffold and coating 604 the scaffold with another material, wherein the coating material is different than the scaffold material. Preferably, the coating material is a polymer. A portion of the sacrificial scaffold is then exposed 606 by removing a portion of the coating at the top and bottom surfaces of the microtruss. Alternatively, any portion of the coating may be removed in any manner that facilitates operation of insulation assembly 500 as described herein. Method 600 also includes removing 608 the sacrificial scaffold by applying at least one of a chemical, heat, and acoustic treatment to the exposed portion of the scaffold. Steps 602, 604, 606, and 608 combine to fabricate a hollow microtruss structure, such as microtrusses 124 and 508 (shown in FIGS. 6 and 11, respectively) having a plurality of truss members, such as truss members 128 and 512 (shown in FIGS. 6 and 11, respectively) interconnected at a plurality of nodes, such as nodes 130 and 514 (shown in FIGS. 6 and 11, respectively).

Method 600 also includes applying 610 an adhesive, such as adhesive 520 (shown in FIG. 11), to at least one of the microtruss and a support structure, such as support structures 122 and 518 (shown in FIGS. 6 and 11, respectively). As described above, in one implementation, the adhesive is a paste adhesive selectively applied to the nodes of the microtruss. Alternatively, the adhesive may be a film adhesive, a reinforced film adhesive, or a spray adhesive. Furthermore, in one implementation, the adhesive is an epoxy or polyurethane adhesive. Alternatively, the adhesive is an adhesive material such as, but not limited to, maleimide, bismaleimide, benzoxazine, cyanate ester, phenolic, polyimide, or any combination thereof. Once the adhesive is applied, the microtruss is coupled 612 to the support structure. Pressure is then applied 614, such as through use of a vacuum bag, to mechanically bond the microtruss and support structure and the adhesive is cured 616 through any known method, such as, but not limited to, time drying and ultrasonic setting.

Method 600 further includes applying 618 a foam material to the microtruss structure and the support structure such that the microtruss structure is encased within the foam material to provide a structural core for the foam material. Applying 618 foam material includes at least one of spraying or pouring the foam material within a plurality of hollow truss members that combine to form the microtruss structure. Once the foam material is set, the foam and the microtruss combine to form a cryofoam layer, such as layers 116 and 502 (shown in FIGS. 6 and 11, respectively), and a sealant layer, such as sealant 524 (shown in FIG. 11) is applied 620 to a top surface, such as top surface 506 (shown in FIG. 11), of the foam. As described above, the sealant layer, in one implementation, is a polyurethane-based polymer that may include an adhesive and serves as a containment membrane to isolate a propellant supply, such as propellant supply 108 (shown in FIGS. 3 and 5) from the cryofoam.

Alternatively, or in addition to applying 620 the sealant layer, a selectively permeable membrane, such as membrane 526 (shown in FIG. 11), may be coupled 622 to one of the cryofoam or the sealant. As described above, the membrane is a loose weave fabric of carbon fiber or graphite fiber that includes a plurality of minute holes such that the membrane allows a flow of fluids therethrough, but prevents the passages of solid particulates. As such, the membrane provides additional protection to the cryofoam by preventing outside particles from impinging on the cryofoam.

In one application, the described embodiments may be utilized as part of an insulation assembly for an aerospace vehicle. The described embodiments are directed to an insulation assembly that includes a reinforced cryofoam material coupled to a propellant vessel that houses a cryogenic propellant. The cryofoam material includes a stochastic foam material and a microtruss structure encased within the foam material such that the microtruss structure provides a structural core for the foam material. In one embodiment, the microtruss structure is comprised of a plurality of substantially hollow members that are lighter in weight than other known internal support systems. Therefore, the insulation assembly has a reduced weight that leads to less propellant required to propel the vehicle and, therefore, is less expensive. Furthermore, the microtruss structure itself is less expensive to produce and may be manufactured at a faster rate than known internal support systems, such as honeycomb cores. Moreover, the insulation assembly having a microtruss core provides more resistance to mechanical and thermal stresses (less spalling and less delamination) than known insulation assemblies.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vessel comprising:
   a vessel wall; and
   an insulation assembly coupled to said vessel wall, said insulation assembly comprising:
      a stochastic foam material;
      a microtruss structure comprising a plurality of truss members interconnected at a plurality of nodes, said microtruss structure encased within said foam material such that said foam material is in contact with said plurality of truss members, wherein said plurality of truss members each include a first end and an opposing second end; and
      a plurality of adhesion features extending obliquely with respect to an outer surface of said plurality of truss members from said plurality of truss members between said first end and said second end to facilitate adhesion between said microtruss structure and said foam material.

2. The vessel in accordance with claim 1, wherein each truss member of said plurality of truss members is substantially hollow.

3. The vessel in accordance with claim 2, wherein said foam material is distributed within said hollow truss members and is distributed between adjacent truss members of said plurality of truss members.

4. The vessel in accordance with claim 1, wherein each truss member of said plurality of truss members is substantially solid.

5. The vessel in accordance with claim 1, wherein said vessel comprises a propellant tank configured to contain a supply of a cryogenic propellant.

6. The vessel in accordance with claim 1, wherein said vessel wall comprises a solid sheet of material.

7. The vessel in accordance with claim 1, wherein said vessel wall comprises a top wall, a bottom wall, and a plurality of supports extending therebetween such that said top and bottom walls and said plurality of supports define a plurality of cavities, wherein said foam material and said microtruss structure are coupled at least one of within said plurality of cavities and to said top wall adjacent said plurality of cavities.

8. The vessel in accordance with claim 1 further comprising a thermal protection layer configured to protect said foam material, wherein said thermal protection layer comprises an outermost layer of said insulation assembly.

9. The vessel in accordance with claim 1, wherein said plurality of adhesion features are formed from at least one of glass fibers and carbon fibers.

10. An aerospace vehicle comprising:
a vessel comprising a vessel wall defining an inner volume that is configured to hold a propellant supply; and
a reinforced insulation assembly coupled to said vessel wall, said insulation assembly comprising;
a stochastic foam material;
a microtruss structure encased within said foam material, said microtruss structure comprising a first end and an opposing second end and providing a structural core for said foam material; and
a plurality of adhesion features extending from said microtruss structure between said first end and said second end, wherein said plurality of adhesion features facilitates adhesion between said microtruss structure and said foam material, wherein said plurality of adhesion features comprise elongated members that extend away from said microtruss structure.

11. The aerospace vehicle in accordance with claim 10, wherein said vessel wall includes an interior and an exterior surface, said insulation assembly coupled to at least one of said interior and said exterior surfaces.

12. The aerospace vehicle in accordance with claim 10, wherein said insulation assembly is coupled to said vessel wall using an adhesive.

13. The aerospace vehicle in accordance with claim 10 further comprising a sealant layer applied to said insulation assembly, said sealant layer configured to isolate said insulation assembly from said propellant supply.

14. The aerospace vehicle in accordance with claim 10, further comprising a selectively permeable membrane coupled to said insulation assembly, said membrane is configured to allow a flow of fluids therethrough and to impede the passage of a solid particulate therethrough.

15. A method of manufacturing an insulation assembly, said method comprising:
fabricating a microtruss structure having a plurality of truss members interconnected at a plurality of nodes;
coupling a plurality of adhesion features to the plurality of truss members such that the plurality of adhesion features extend only partially about a circumference of the plurality of truss members;
coupling the microtruss structure to a wall of a vessel; and
applying a foam material to the microtruss structure and the vessel wall such that the microtruss structure is encased within the foam material to provide a structural core for the foam material, wherein the plurality of adhesion features facilitate adhesion between the microtruss structure and the foam material.

16. The method in accordance with claim 15, wherein fabricating a microtruss structure comprises fabricating a hollow microtruss structure by:
fabricating a scaffold;
coating the scaffold with a material; and
removing the scaffold.

17. The method in accordance with claim 15, wherein coupling the microtruss structure to a wall of a vessel further comprises applying an adhesive to at least one of the microtruss structure and the vessel wall.

18. The method in accordance with claim 15, wherein the plurality of truss members comprises a plurality of hollow truss members, and wherein applying a foam material to the microtruss structure further comprises one of spraying or pouring the foam material within the plurality of hollow truss members that combine to form the microtruss structure.

19. The method in accordance with claim 15 further comprising applying a sealant to a top surface of the foam material, wherein the sealant is configured to isolate the microtruss structure and the foam material from a propellant supply contained within the vessel.

20. The method in accordance with claim 19 further comprising coupling a selectively permeable membrane to one of the top surface of the foam material or the sealant.

* * * * *